United States Patent
Kitamura (10) Patent No.: US 8,334,077 B2
(45) Date of Patent: Dec. 18, 2012

(54) FUEL CELL SYSTEM AND FUEL CELL VEHICLE

(75) Inventor: Nobuyuki Kitamura, Minamitsuru-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 610 days.

(21) Appl. No.: 12/308,391

(22) PCT Filed: Jul. 11, 2007

(86) PCT No.: PCT/JP2007/063799
§ 371 (c)(1),
(2), (4) Date: Dec. 12, 2008

(87) PCT Pub. No.: WO2008/007689
PCT Pub. Date: Jan. 17, 2008

(65) Prior Publication Data
US 2010/0047646 A1 Feb. 25, 2010

(30) Foreign Application Priority Data
Jul. 13, 2006 (JP) ................................ 2006-193303

(51) Int. Cl.
*H01M 8/04* (2006.01)
(52) U.S. Cl. ...................................... 429/429
(58) Field of Classification Search .................. 429/429, 429/444, 446
See application file for complete search history.

(56) References Cited

U.S. PATENT DOCUMENTS

| | | | |
|---|---|---|---|
| 5,543,238 A * | 8/1996 | Strasser | 429/409 |
| 7,360,395 B2 * | 4/2008 | Sasaki et al. | 73/25.05 |
| 2001/0013761 A1 * | 8/2001 | Yoshida et al. | 318/254 |
| 2004/0013920 A1 | 1/2004 | Hasuka et al. | |
| 2006/0147323 A1 * | 7/2006 | Stute et al. | 417/405 |
| 2006/0216555 A1 | 9/2006 | Shige et al. | |
| 2007/0035272 A1 * | 2/2007 | Hattori et al. | 318/823 |
| 2007/0287044 A1 * | 12/2007 | Arthur et al. | 429/25 |
| 2007/0289326 A1 * | 12/2007 | Nishikawa et al. | 62/498 |

FOREIGN PATENT DOCUMENTS

| | | |
|---|---|---|
| JP | A-07-192743 | 7/1995 |
| JP | A-09-259909 | 10/1997 |
| JP | A-2003-217626 | 7/2003 |
| JP | A-2003-331894 | 11/2003 |

(Continued)

OTHER PUBLICATIONS

The First Office Action for corresponding Chinese Patent Application No. 200780026004.5, dated Oct. 29, 2010 (w/ partial English translation).

*Primary Examiner* — Jean F Duverne
(74) *Attorney, Agent, or Firm* — Oliff & Berridge, PLC (57) ABSTRACT

A fuel cell system capable of suppressing noise caused by backflow of air when a compressor stops. Also, there is provided a fuel cell vehicle provided with this fuel cell system. A fuel cell system includes a fuel cell and a compressor that compresses air taken in from outside and supplies compressed air to the fuel cell. Operation of the compressor is stopped after a pressure difference between an upstream side and a downstream side of the compressor has become equal to or smaller than a predetermined value by using a control unit. In this case, the predetermined value can be a pressure difference corresponding to a predetermined noise level.

16 Claims, 5 Drawing Sheets

FOREIGN PATENT DOCUMENTS

| | | |
|---|---|---|
| JP | A-2004-056868 | 2/2004 |
| JP | A-2004-095384 | 3/2004 |
| JP | A-2004-129433 | 4/2004 |
| JP | A-2004-178847 | 6/2004 |
| JP | A-2005-083202 | 3/2005 |
| JP | A-2005-203118 | 7/2005 |
| JP | A-2005-209634 | 8/2005 |
| JP | A-2005-259440 | 9/2005 |
| JP | A-2005-327635 | 11/2005 |
| JP | A-2005-353438 | 12/2005 |
| JP | A-2006-019123 | 1/2006 |
| JP | A-2007-109428 | 4/2007 |
| WO | WO 2005/078844 A1 | 8/2005 |

* cited by examiner

FUEL CELL SYSTEM AND FUEL CELL VEHICLE

TECHNICAL FIELD

The present invention relates to a fuel cell system and a fuel cell vehicle. More particularly, the present invention relates to a fuel cell system provided with a compressor for compressing air taken in from the outside and supplying the compressed air, and to a fuel cell and a fuel cell vehicle provided with the fuel cell system.

BACKGROUND ART

The fuel cell has a construction in which an anode and a cathode are arranged with an electrostatic membrane being held therebetween. Hydrogen (fuel gas) is supplied to the anode, and oxygen (oxidizing gas) is supplied to the cathode, by which an electrochemical reaction takes place between the electrodes to generate an electromotive force.

For the fuel gas, high-pressure hydrogen (for example, 70 MPa) stored, for example, in a high-pressure hydrogen tank is supplied to the anode through a gas supply path after having been decompressed. Hydrogen discharged from the anode is sent again to the gas supply path by a fuel pump. On the other hand, for the oxidizing gas, air taken in from the outside is supplied to the cathode, for example, by using a compressor.

The fuel cell system is provided with, in addition to the aforementioned fuel pump and compressor, a large number of rotary components such as a cooling water pump for cooling the fuel cell by circulating cooling water. For these rotary components, the operation rotational speed of each of the components is set considering a power consumption, service life, noise of simple component, and the like. However, if the frequencies of noises produced from the rotary components approach each other, interference occurs when the operation rotational speed fluctuates, which poses a problem in that harsh "whining sounds" are produced.

To solve this problem, a method has been proposed in which the frequencies of noises produced during idling of the rotary components are set so as to separate 30 Hertz or more from each other (refer to Patent Document 1). According to this method, the noises produced from two or more rotary components can be prevented from being recognized as one sound, and also the whining sounds can be suppressed, so that hearing organs of human being do not feel discomfort.
Patent Document 1: JP-A-2004-178847
Patent Document 2: JP-A-H7-192743
Patent Document 3: JP-A-2005-83202

DISCLOSURE OF THE INVENTION

Problem to be Solved by the Invention

A problem with the conventional fuel cell systems is that if the compressor stops, air flows backward from the downstream high pressure side to the upstream low pressure side, by which noise is produced. To solve this problem, it is conceivable that a check valve is provided on the compressor to prevent air from flowing backward. However, the check valve provides flow path resistance, so that a pressure loss is produced. Therefore, the efficiency of air supply to the cathode decreases.

The present invention has been made to solve the above problem, and accordingly an object thereof is to provide a fuel cell system capable of suppressing noise caused by backflow of air when a compressor stops.

Another object of the present invention is to provide a fuel cell vehicle provided with the above-mentioned fuel cell system.

Other objects and advantages of the present invention will become apparent from an explanation described below.

Means for Solving the Problem

The first aspect of the present invention relates a fuel cell system, the fuel cell system comprising: a fuel cell; and a compressor which compresses air taken in from an outside and supplies compressed air to the fuel cell via a gas supply path, wherein, when supply of air to the fuel cell is stopped, operation of the compressor is stopped after a pressure difference between an upstream side and a downstream side of the compressor has become equal to or smaller than a predetermined value.

In the first aspect of the present invention, the fuel cell system further comprises a pressure regulating valve for regulating a pressure of the air supplied from the compressor to the fuel cell, wherein the pressure regulating valve is arranged in at least one of the gas supply path and a gas discharge path, which is a flow path of gas discharged from the fuel cell, and the operation of the compressor can be stopped after the pressure regulating valve has been opened and the pressure difference has become equal to or smaller than the predetermined value.

In the first aspect of the present invention, the fuel cell system further comprises a discharge valve for discharging air on the downstream side of the compressor into atmosphere without causing the air to pass through the fuel cell, wherein the operation of the compressor can be stopped after the discharge valve has been opened and the pressure difference has become equal to or smaller than the predetermined value.

The second aspect of the present invention is a fuel cell system comprising: a fuel cell; and a compressor which compresses air taken in from an outside and supplies compressed air to the fuel cell via a gas supply path, wherein, when supply of air to the fuel cell is stopped, operation of the compressor is stopped after predetermined time has elapsed from when rotational speed of the compressor was set at a value which is smaller than that at a time of ordinary power generation of the fuel cell but is not zero.

In the second aspect of the present invention, the fuel cell system further comprises a pressure regulating valve for regulating a pressure of the air supplied from the compressor to the fuel cell, wherein the pressure regulating valve is arranged in at least one of the gas supply path and a gas discharge path, which is a flow path of gas discharged from the fuel cell, and the operation of the compressor can be stopped after the pressure regulating valve has been opened and a pressure difference has become equal to or smaller than a predetermined value.

In the second aspect of the present invention, the fuel cell system further comprises a discharge valve for discharging the air on the downstream side of the compressor into the atmosphere without causing the air to pass through the fuel cell, and wherein the operation of the compressor can be stopped after the discharge valve has been opened and the pressure difference has become equal to or smaller than the predetermined value.

The third aspect of the present invention is a fuel cell system comprising: a fuel cell; a compressor which compresses air taken in from an outside and supplies compressed air to the fuel cell via a gas supply path; and a throttle valve which is arranged in a gas discharge path, which is a flow path of gas discharged from the fuel cell, wherein, when supply of air to the fuel cell is stopped, operation of the compressor is stopped after a degree of opening of the throttle valve has been made large as compared with a case where the supply of air is not stopped.

The fourth aspect of the present invention is a fuel cell vehicle mounted with the fuel cell system according to any one of the first to third aspects, comprising: accelerating operation detecting means for detecting operation of an accelerating operation member; decelerating operation detecting means for detecting operation of a decelerating operation member; and pressure control means which decrease a pressure of air supplied to the fuel cell when the accelerating operation member is not operated, and increase the pressure of the air supplied to the fuel cell when the accelerating operation member is operated, wherein, when the pressure of the air is decreased by the pressure control means and the decelerating operation member is operated, operation of the compressor is stopped.

The fifth aspect of the present invention is a fuel cell vehicle mounted with the fuel cell system according to any one of the first to third aspects, comprising: accelerating operation detecting means for detecting operation of an accelerating operation member; and pressure control means which decrease a pressure of air supplied to the fuel cell when the accelerating operation member is not operated, and increase the pressure of air supplied to the fuel cell when the accelerating operation member is operated, wherein, when the pressure of air is decreased by the pressure control means and a fixed period of time has elapsed from when the accelerating operation member is not operated, operation of the compressor is stopped.

Effects of the Invention

According to the first aspect of the present invention, the operation of compressor is stopped after the pressure difference between the upstream side and the downstream side of the compressor has become equal to or smaller than the predetermined value. Therefore, a noise caused by backflow of air can be suppressed.

According to the second aspect of the present invention, the operation of the compressor is stopped after the predetermined time has elapsed from when the rotational speed of the compressor is reduced. Therefore, noise caused by backflow of air can be suppressed.

According to the third aspect of the present invention, the operation of the compressor is stopped after the degree of opening of the throttle valve has been made large as compared with the case where the supply of air to the fuel cell is not stopped. Therefore, noise caused by backflow of air can be suppressed.

According to the fourth aspect of the present invention, waste of air supplied to the fuel cell is eliminated, by which fuel consumption can be improved. Also, noise caused by backflow of air when the compressor stops can be suppressed.

According to the fifth aspect of the present invention, the waste of air supplied to the fuel cell is eliminated, by which the fuel consumption can be improved. Also, the noise caused by the backflow of air when the compressor stops can be suppressed.

BEST MODE FOR CARRYING OUT THE INVENTION

First Embodiment

Figure 1:
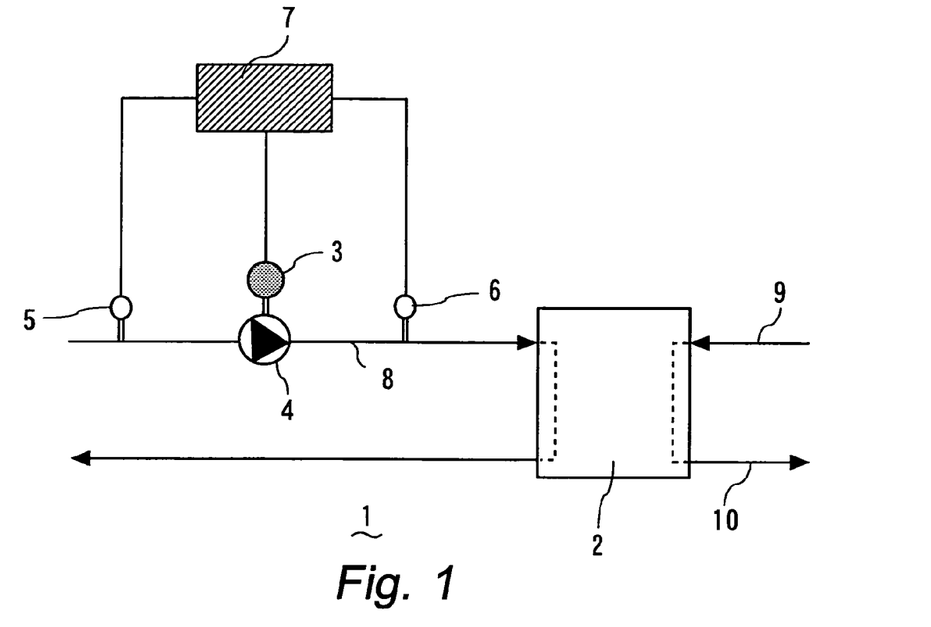
FIG. 1 is a partial configuration view of a fuel cell system according to a first embodiment.

FIG. 1 is a partial configuration view of a fuel cell system according to a first embodiment. This fuel cell system can be applied to various applications in an on-vehicle mode, a stationary mode, or other modes. In FIG. 1, sections for supplying gas to an anode of a fuel cell, such as a fuel gas supply system for supplying gas to the anode, a fuel gas flow rate control unit for controlling a flow rate of fuel gas sent from the fuel gas supply system, and a circulation unit for supplying gas discharged from the fuel cell to the fuel cell again, are omitted.

As shown in FIG. 1, the fuel cell system 1 has: a fuel cell 2 to which hydrogen and oxygen are supplied to generate an electromotive force; a compressor 4 that is driven by a motor 3 to supply air to a cathode (not shown) of the fuel cell 2 through a gas supply path 8; pressure sensors 5 and 6 provided on the upstream side and the downstream side of the compressor 4, respectively; and a control unit 7 for controlling the operation during the time when the compressor 4 is stopped. The compressor 4 has a construction not provided with a check valve for preventing air from flowing backward.

In FIG. 1, hydrogen is supplied to the anode (not shown) through a gas supply path 9. Gas discharged from the anode to a gas discharge path 10 is sent again to the gas supply path 9. Also, to a halfway portion of the gas discharge path 10, another flow path (not shown) is connected via a discharge valve (not shown). When the discharge valve is opened at predetermined timing, the gas discharged from the anode is discharged to the outside through another flow path.

The fuel cell 2 has a structure that an internal volume is large, and pressure loss is high. Therefore, for the fuel cell system 1, the air compressed by the compressor 4 is sent into the fuel cell 2. However, if the compressor 4 is stopped suddenly in this state, the air remaining on the downstream side of the compressor 4 expands and flows backward to the upstream side. At this time, a noise such as an explosive sound is produced.

To reduce the noise, the air should be inhibited from flowing backward. For this purpose, the operation of the compressor 4 should be stopped after a pressure difference $\Delta P$ between the upstream side and the downstream side of the compressor 4 has been made small. Therefore, in this embodiment, when the operation of the fuel cell system 1 is stopped completely, the compressor 4 is not stopped immediately, and the operation of the compressor 4 is stopped after a check has been made to ensure that the pressure difference $\Delta P$ has a predetermined or smaller value.

Figure 2:
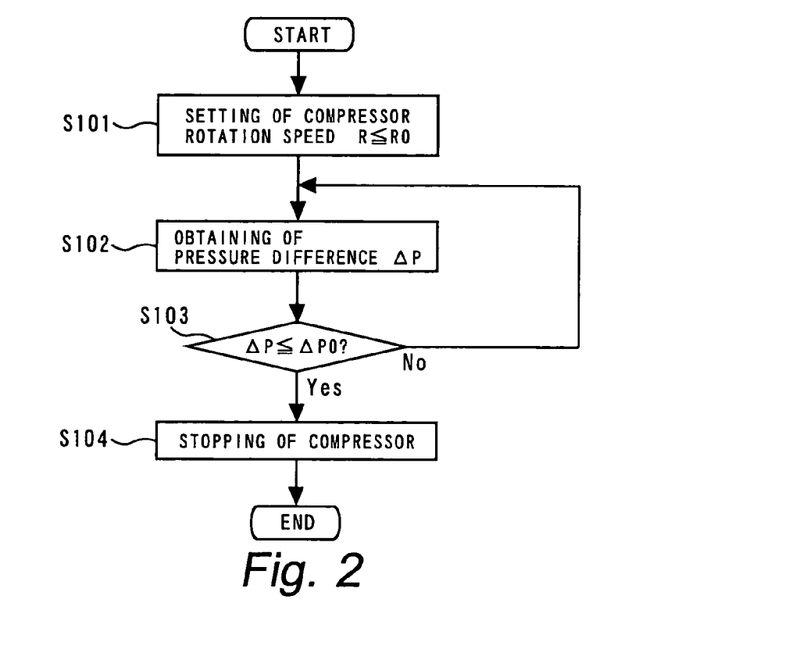
FIG. 2 is a flowchart for explaining a method for stopping the compressor 4 by using the control unit 7 in the first embodiment.

FIG. 2 is a flowchart for explaining a method for stopping the compressor 4 by using the control unit 7. This figure can be applied to all cases where the supply of air to the fuel cell 2 is stopped including not only the case where the operation of the fuel cell system 1 is stopped completely but also the case where the power generation of the fuel cell 2 is shut off temporarily.

As shown in FIG. 2, when the control for stopping the operation of the fuel cell system 1 is started, first, rotational speed R of the compressor 4 is set at a value that is smaller than that at the ordinary power generation time of the fuel cell 2 but is not zero, in other words, at a predetermined value R0 (however, R>R0) or a value R1 smaller than the predetermined value R0 (Step S101). Then, the rotational speed R decreases gradually, and compression of air is stopped. However, since the operation of the compressor 4 continues, supply of air to the fuel cell 2 is not stopped.

The rotational speed R of the compressor 4 correlates with a pressure difference $\Delta P$ between the upstream side and the downstream side of the compressor 4. For example, as the rotational speed R increases, the pressure on the downstream side increases, so that the pressure difference $\Delta P$ becomes large. If the operation of the compressor 4 is stopped inadvertently in the state in which the pressure difference ΔP is large, the noise produced by the backflow of air becomes loud. Therefore, the relationship between the pressure difference ΔP and the noise is obtained, and a pressure difference ΔP0 corresponding to an allowable noise level is determined. Then, the rotational speed of the compressor 4 that produces the pressure difference ΔP0 is obtained. The obtained value corresponds to the aforementioned predetermined value R0.

If the rotational speed R is set at the predetermined value R0 or the value R1 in Step S101, the pressure difference ΔP gradually approaches ΔP0. If the operation of the compressor 4 is stopped when the pressure difference ΔP becomes equal to or smaller than ΔP0, the produced noise can be made to have loudness not higher than the allowable level.

In Step S102, the pressure difference ΔP is obtained. Specifically, the pressure difference ΔP can be obtained by the pressure sensors 5 and 6. Since the pressure on the upstream side of the compressor 4 is equal to the atmospheric pressure, if the atmospheric pressure is 1 atm, the pressure difference ΔP can be obtained by measuring the pressure on the downstream side of the compressor 4 by using the pressure sensor 6.

Next, it is judged whether or not the obtained pressure difference ΔP is equal to or smaller than ΔP0 (Step S103). If ΔP is larger than ΔP0, the control returns to Step S102. Then, in Step S103, the operation for judging whether or not ΔP is equal to or smaller than ΔP0 is repeated.

On the other hand, if ΔP is equal to or smaller than ΔP0 in Step S103, it is judged that the pressure difference not higher than the allowable noise level is attained, and the operation of the compressor 4 is stopped (Step S104). Thereby, the supply of air to the fuel cell 2 can be stopped completely while the noise caused by the backflow of air can be suppressed.

Figure 3:
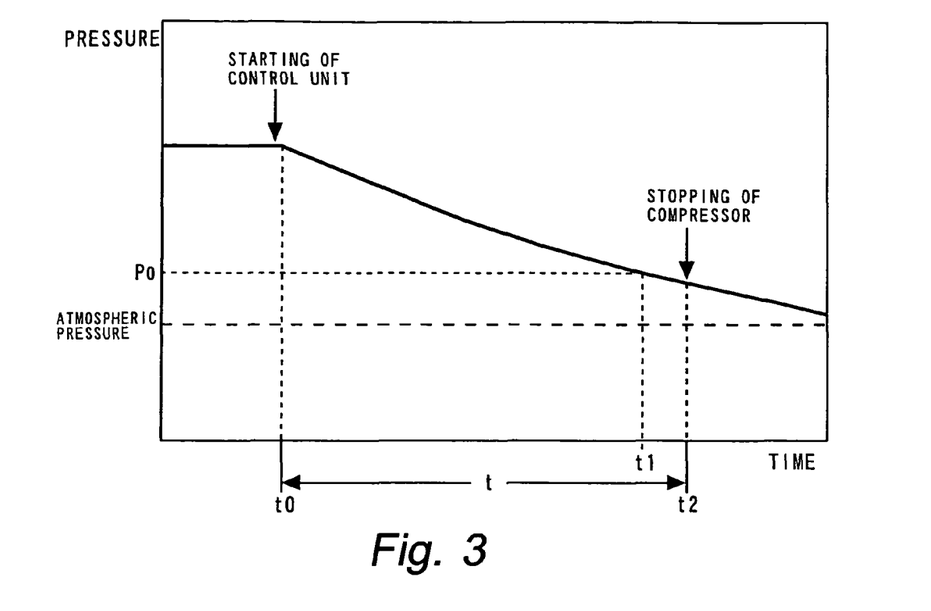
FIG. 3 is a diagram showing a time change of the pressure P on the downstream side of the compressor 4 in the first embodiment.

FIG. 3 shows a time change of the pressure P on the downstream side of the compressor 4. As described above, the control for stopping the operation of the fuel cell system 1 is started. Then, in Step S101 (time t0 in FIG. 3), the rotational speed R of the compressor 4 is set at R0 or R1. Thereby, the rotational speed R is decreased, so that the pressure difference ΔP, in other words, the pressure P on the downstream side of the compressor 4 decreases gradually. At time t1, the pressure P reaches a pressure P0. If the operation of the compressor 4 is stopped when the pressure P becomes equal to or lower than the pressure P0 (that is, at time t1 or later), the noise caused by the backflow of air can be suppressed. Here, "P0–atmospheric pressure" is equal to ΔP0.

From FIG. 3, the above-described embodiment can also be modified as described below. In the above-described embodiment, the pressure difference ΔP (or the pressure P) has been obtained, and it has been judged whether or not this value is equal to or smaller than ΔP0 (or P0). In contrast, time t until ΔP becomes equal to or smaller than ΔP0 (or P becomes equal to or lower than P0) was obtained in advance, and the compressor 4 may be stopped completely after the time t has elapsed from when the set value of rotational speed was changed in Step S101. That is to say, the compressor 4 may be stopped completely at time t2 when the predetermined time t has elapsed from the time t0. According to this method, the pressure difference ΔP (or the pressure P) need not be obtained, so that a system in the control unit 7 can be simplified.

Second Embodiment

Figure 4:
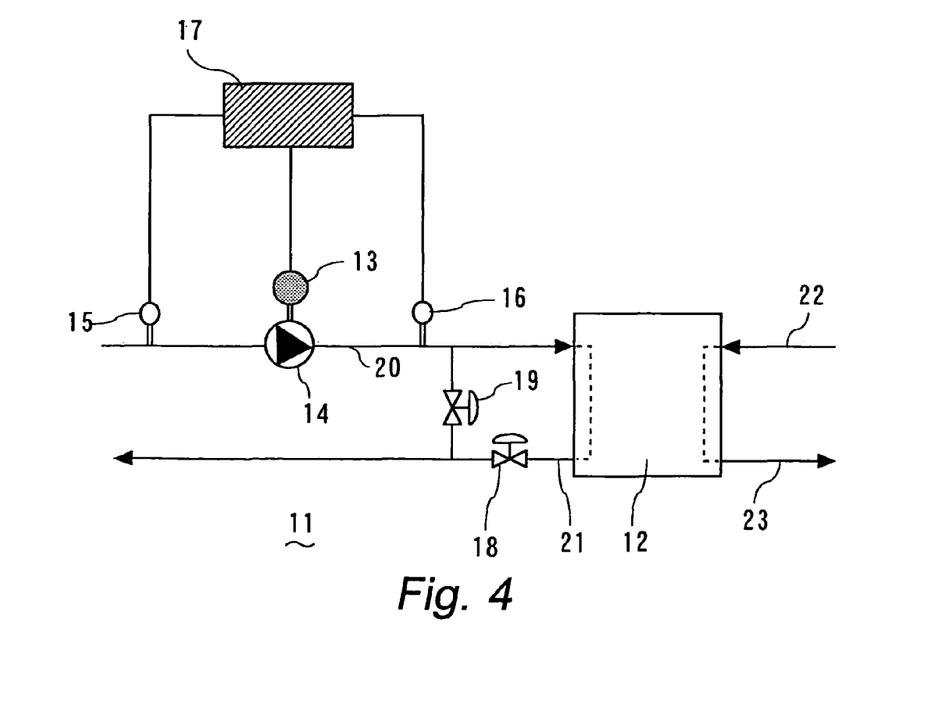
FIG. 4 is a partial configuration view of a fuel cell system according to a second embodiment.

FIG. 4 is a partial configuration view of a fuel cell system according to a second embodiment. This fuel cell system can be applied to various applications in an on-vehicle mode, a stationary mode, or other modes. In FIG. 4, sections for supplying gas to an anode of a fuel cell, such as a fuel gas supply system for supplying gas to the anode, a fuel gas flow rate control unit for controlling a flow rate of fuel gas sent from the fuel gas supply system, and a circulation unit for supplying gas discharged from the fuel cell to the fuel cell again, are omitted.

As shown in FIG. 4, the fuel cell system 11 has: a fuel cell 12 to which hydrogen and oxygen are supplied to generate an electromotive force; a compressor 14 that is driven by a motor 13 to supply air to a cathode (not shown) of the fuel cell 12 through a gas supply path 20; pressure sensors 15 and 16 provided on the upstream side and the downstream side of the compressor 4, respectively; a control unit 17 for controlling the operation during the time when the compressor 14 is stopped; a pressure regulating valve 18 for regulating a pressure of air supplied from the compressor 14 to the fuel cell 12; and a discharge valve 19 for discharging the air on the downstream side of the compressor 14 into the atmosphere without causing it to pass through the fuel cell 12. The compressor 14 has a construction not provided with a check valve for preventing air from flowing backward.

In FIG. 4, hydrogen is supplied to the anode (not shown) through a gas supply path 22. The gas discharged from the anode to a gas discharge path 23 is sent again to the gas supply path 22. Also, to a halfway portion of the gas discharge path 23, another flow path (not shown) is connected via a discharge valve (not shown). When the discharge valve is opened at predetermined timing, the gas discharged from the anode is discharged to the outside through another flow path.

In the example shown in FIG. 4, the pressure regulating valve 18 is provided in a gas discharge path 21, which is a flow path for the gas discharged from the fuel cell 12. The present invention is not limited to this configuration. The pressure regulating valve 18 may be provided in the gas supply path 20, or may be provided in both of the gas discharge path 21 and the gas supply path 20.

The fuel cell 12 is constructed so that an internal volume is large, and pressure loss is high. Therefore, for the fuel cell system 11, the air compressed by the compressor 14 is sent into the fuel cell 12. However, if the compressor 14 is stopped suddenly in this state, the air remaining on the downstream side of the compressor 14 expands and flows backward to the upstream side. At this time, a noise such as an explosive sound is produced.

To reduce the noise, the air should be inhibited from flowing backward. For this purpose, the operation of the compressor 14 should be stopped after a pressure difference ΔP between the upstream side and the downstream side of the compressor 14 has been made small. Therefore, in this embodiment, as in the first embodiment, when the operation of the fuel cell system 11 is stopped completely, the compressor 14 is not stopped immediately, and the operation of the compressor 14 is stopped after a check has been made to ensure that the pressure difference ΔP has a predetermined or smaller value.

This embodiment is common to the first embodiment in that the pressure difference ΔP is made small by decreasing the rotational speed of the compressor 14. Furthermore, this embodiment is characterized in that the pressure loss on the downstream side of the compressor 14 is reduced by opening the pressure regulating valve 18.

Figure 5:
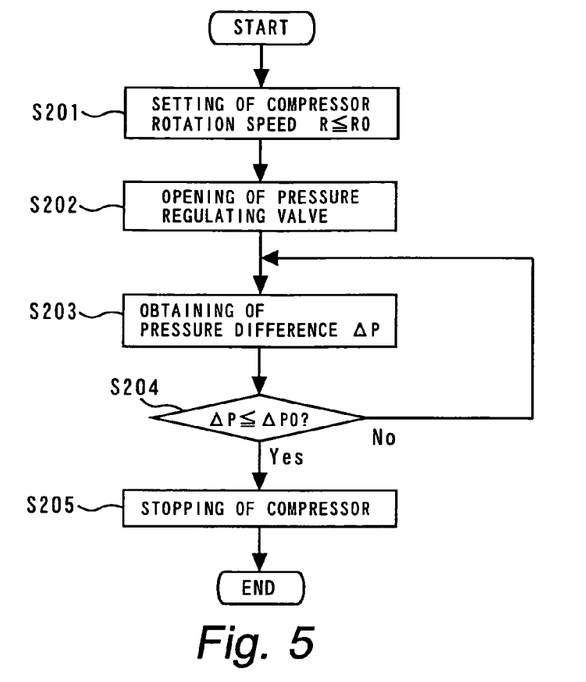
FIG. 5 is a flowchart for explaining a method for stopping the compressor 14 by using the control unit 17 in the second embodiment.

FIG. 5 is a flowchart for explaining a method for stopping the compressor 14 by using the control unit 17. This figure can be applied to all cases where the supply of air to the fuel cell 12 is stopped including not only the case where the operation of the fuel cell system 11 is stopped completely but also the case where the power generation of the fuel cell 12 is shut off temporarily.

As shown in FIG. 5, the control for stopping the operation of the fuel cell system 11 is started. Then, the rotational speed R of the compressor 14 is set at a value that is smaller than that at the ordinary power generation time of the fuel cell 12 but is not zero, in other words, at a predetermined value R0 (however, R>R0) or a value R1 smaller than the predetermined value R0 (Step S201). Then, the rotational speed R decreases gradually, and the compression of air is stopped. However, since the operation of the compressor 14 continues, the supply of air to the fuel cell 12 is not stopped.

The rotational speed R of the compressor 14 correlates with a pressure difference $\Delta P$ between the upstream side and the downstream side of the compressor 14. For example, as the rotational speed R increases, the pressure on the downstream side increases, so that the pressure difference $\Delta P$ becomes large. If the operation of the compressor 14 is stopped inadvertently in the state in which the pressure difference $\Delta P$ is large, the noise produced by the backflow of air becomes loud. Therefore, the relationship between the pressure difference $\Delta P$ and the noise is obtained, and a pressure difference $\Delta P0$ corresponding to an allowable noise level is determined. Then, the rotational speed of the compressor 14 that produces the pressure difference $\Delta P0$ is obtained. The obtained value corresponds to the aforementioned predetermined value R0.

Next, the pressure regulating valve 18 is fully opened (Step S202). Thereby, the pressure loss on the downstream side of the compressor 14 can be reduced. Here, the discharge valve 19 may be fully opened in place of the pressure regulating valve 18. Thereby, the air on the downstream side of the compressor 14 can be discharged. Also, both of the pressure regulating valve 18 and the discharge valve 19 may be fully opened.

If the rotational speed R is set at the predetermined value R0 or the value R1 in Step S201, the pressure difference $\Delta P$ gradually approaches $\Delta P0$. By opening at least one of the pressure regulating valve 18 and the discharge valve 19 in Step S202, the pressure on the downstream side of the compressor 14 can be decreased rapidly, so that a rate at which the pressure difference $\Delta P$ gradually approaches $\Delta P0$ can be increased. If the operation of the compressor 14 is stopped when the pressure difference $\Delta P$ becomes equal to or smaller than $\Delta P0$, the produced noise can be made to have loudness not higher than the allowable level.

In Step S203, the pressure difference $\Delta P$ is obtained. Specifically, the pressure difference $\Delta P$ can be obtained by the pressure sensors 15 and 16. Since the pressure on the upstream side of the compressor 14 is equal to the atmospheric pressure, if the atmospheric pressure is 1 atm, the pressure difference $\Delta P$ can be obtained by measuring the pressure on the downstream side of the compressor 14 by using the pressure sensor 16.

Next, it is judged whether or not the obtained pressure difference $\Delta P$ is equal to or smaller than $\Delta P0$ (Step S204). If $\Delta P$ is larger than $\Delta P0$, the control returns to Step S203. Then, in Step S204, the operation for judging whether or not $\Delta P$ is equal to or smaller than $\Delta P0$ is repeated.

On the other hand, if $\Delta P$ is equal to or smaller than $\Delta P0$ in Step S204, it is judged that the pressure difference not higher than the allowable noise level is attained, and the operation of the compressor 14 is stopped (Step S205). Thereby, the supply of air to the fuel cell 12 can be stopped completely while the noise caused by the backflow of air can be suppressed.

Figure 6:
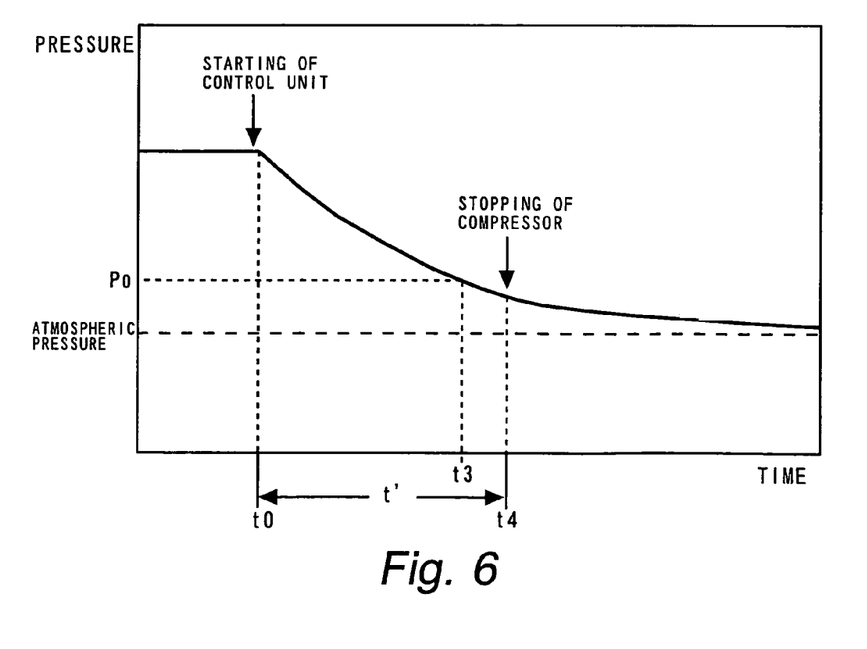
FIG. 6 is a diagram showing a time change of the pressure P on the downstream side of the compressor 14 in the second embodiment.

FIG. 6 shows a time change of the pressure P on the downstream side of the compressor 14. As in FIG. 3 explained in the first embodiment, the control for stopping the operation of the fuel cell system 11 is started at time t0, and then the pressure difference $\Delta P$, in other words, the pressure P on the downstream side of the compressor 14 decreases gradually. At time t3, the pressure P reaches a pressure P0. In this embodiment, since at least one of the pressure regulating valve 18 and the discharge valve 19 is opened in addition to the decrease in rotational speed of the compressor 14, the rate of decrease in the pressure P is increased as compared with the first embodiment. Therefore, a pressure equal to or lower than P0 can be achieved in a shorter period of time t'. Here, "P0−atmospheric pressure" is equal to $\Delta P0$.

From FIG. 6, the above-described embodiment can also be modified as described below. In the above-described embodiment, the pressure difference $\Delta P$ (or the pressure P) has been obtained, and it has been judged whether or not this value is equal to or smaller than $\Delta P0$ (or P0). In contrast, time t' until $\Delta P$ becomes equal to or smaller than $\Delta P0$ (or P becomes equal to or lower than P0) was obtained in advance, and the compressor 14 may be stopped completely after the time t' has elapsed from when the set value of rotational speed was changed in Step S201. That is to say, the compressor 14 may be stopped completely at time t4 when the predetermined time t' has elapsed from the time t0. According to this method, the pressure difference $\Delta P$ (or the pressure P) need not be obtained, so that a system in the control unit 17 can be simplified.

Figure 7:
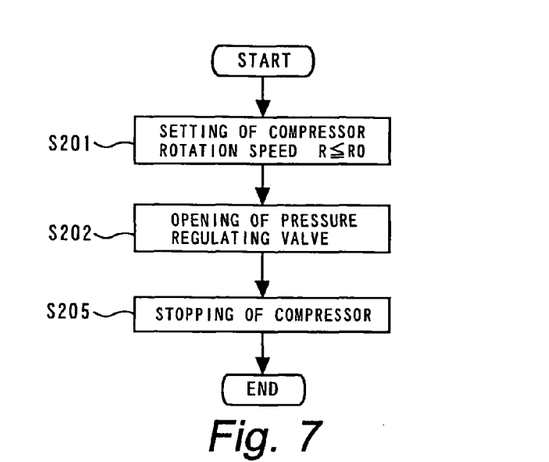
FIG. 7 is a flowchart for explaining a method for stopping the compressor 14 carried out by the control unit 17 in a variation of the second embodiment.

Also, the above-described embodiment can be modified as shown in FIG. 7. FIG. 7 is a flowchart for explaining a method for stopping the compressor 14 carried out by the control unit 17 in a variation of the second embodiment. The flow shown in FIG. 7 is started when the supply of air to the fuel cell 12 is stopped.

According to the flow shown in FIG. 7, as in the flow shown in FIG. 5, the rotational speed R of the compressor 14 is set at the predetermined value R0 (or R1)(Step S201). Then, the pressure regulating valve 18 is fully opened (Step S202). Thereafter, unlike the flow shown in FIG. 5, the operation of the compressor 14 is stopped (Step S205).

Here, since the pressure loss on the downstream side of the compressor 14 becomes low when the pressure regulating valve 18 is fully opened, the pressure on the downstream side of the compressor 14 approaches the atmospheric pressure in a short period of time. That is to say, by fully opening the pressure regulating valve 18, the pressure on the downstream side of the compressor 14 can be reduced in a moment. Therefore, even if the operation of the compressor 14 is stopped immediately after the pressure regulating valve 18 has been fully opened as in this embodiment, the noise caused by the backflow of air can be suppressed.

In the above-mentioned Step S202, the pressure regulating valve 18 is fully opened. However, the degree of opening of the pressure regulating valve 18 may be a degree of opening larger than that at the time when the supply of air to the fuel cell 12 is not stopped.

In the above-described embodiment and variations, the case where the present invention is applied to the system provided with the pressure regulating valve 18 for regulating the pressure of air have been explained. However, in place of the pressure regulating valve 18, at least a throttle valve in which the degree of opening can be changed may be provided in the gas discharge path 21. In the case where the supply of air to the fuel cell 12 is stopped, the degree of opening of the throttle valve is made large as compared with the case where the supply of air is not stopped (for example, the throttle valve is fully opened), whereby the noise caused by the backflow of air can be suppressed.

Also, although the discharge valve 19 is provided in the system shown in FIG. 4, the discharge valve 19 need not necessarily be provided.

Third Embodiment

In the first and second embodiments, there has been described the method for stopping the compressor when the supply of air to the fuel cell is stopped, including the case where the operation of the fuel cell system is stopped completely and the case where the power generation of the fuel cell is shut off temporarily. As a specific example of these cases, a case where a vehicle mounted with the fuel cell system is decelerated or stopped can be cited. When the vehicle is decelerated or stopped, it is preferable that the operation of compressor be stopped from the viewpoint of improved fuel consumption. Therefore, in a third embodiment, a method is described in which the compressor is stopped while the noise caused by the backflow of air is suppressed when the vehicle is decelerated or stopped.

Figure 8:
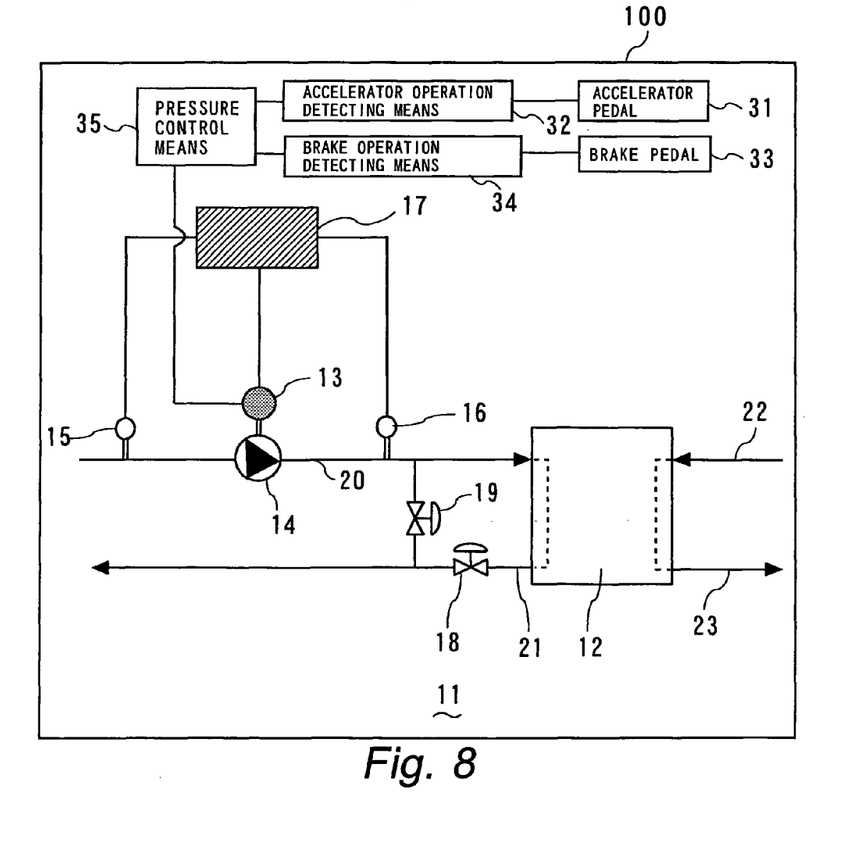
FIG. 8 is a schematic view for explaining the fuel cell vehicle according to a third embodiment.

The vehicle described in this embodiment is a fuel cell vehicle provided with the fuel cell system described in the first or second embodiment. Hereunder, the fuel cell vehicle provided with the fuel cell system 11 of the second embodiment is explained. FIG. 8 is a schematic view for explaining the fuel cell vehicle according to a third embodiment. This fuel cell vehicle 100 has: accelerator operation detecting means 32; brake operation detecting means 34; and pressure control means 35. The accelerator operation detecting means 32 detect the operation of an accelerator pedal 31. The brake operation detecting means 34 detect the operation of a brake pedal 33. The pressure control means 35 decrease the pressure of air supplied to the fuel cell 12 when the accelerator pedal 31 is OFF (not pressed down), and increase the pressure of air supplied to the fuel cell 12 when the accelerator pedal 31 is ON (pressed down). This embodiment is characterized in that when the pressure of air is decreased by the pressure control means 35 and the brake pedal 33 is operated, the operation of the compressor 14 is stopped.

The pressure control means 35 may be provided in the control unit 17 (7). In other words, the pressure control means 35 may be configured as a part of the control unit 17 (7).

The accelerator pedal 31 and the accelerator operation detecting means 32 correspond to "accelerating operation member" and "accelerating operation detecting means" in the present invention, respectively. Also, the brake pedal 33 and the brake operation detecting means 34 correspond to "decelerating operation member" and "decelerating operation detecting means" in the present invention, respectively. The phrase "the accelerator pedal 31 is ON" means that the accelerating operation member is operated. The phrase "the accelerator pedal 31 is OFF" means that the accelerating operation member is not operated. Also, the phrase "the brake pedal 33 is ON" means that the decelerating operation member is operated, and the phrase "the brake pedal 33 is OFF" means that the decelerating operation member is not operated.

Figure 9:
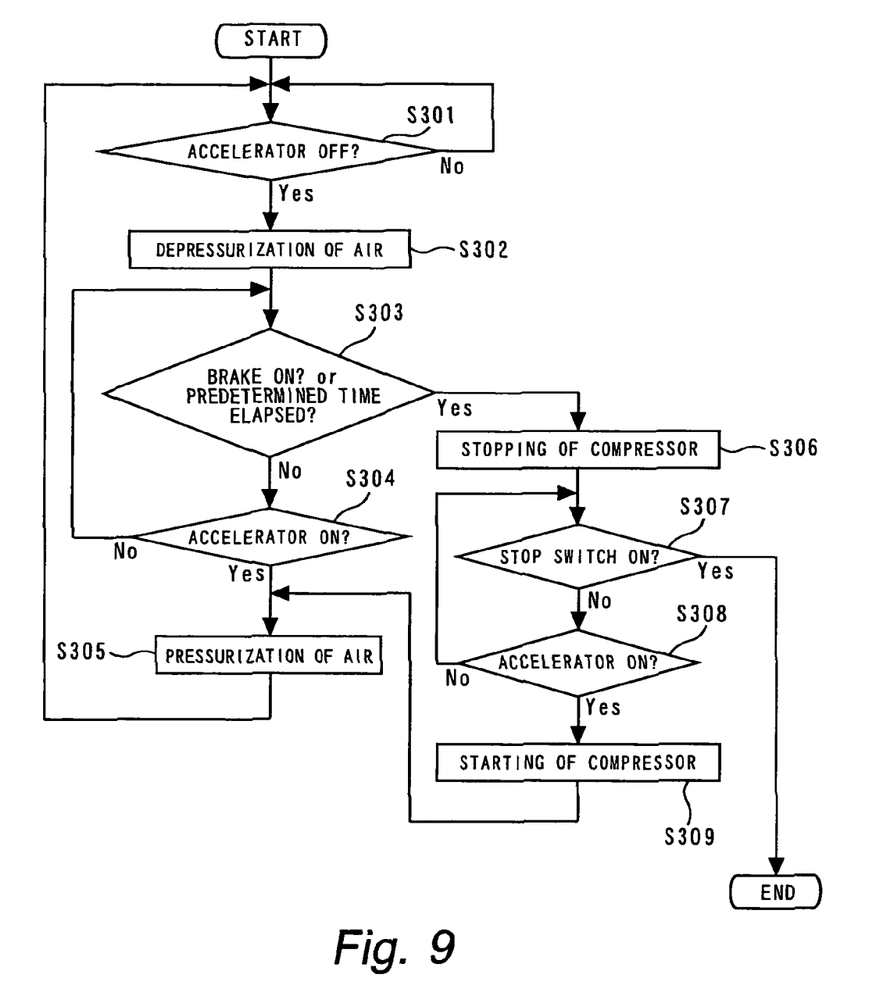
FIG. 9 is a flowchart for explaining a method for controlling the compressor in the third embodiment.

FIG. 9 is a flowchart for explaining a method for controlling the compressor in this embodiment. As shown in FIG. 9, first, it is judged by the accelerator operation detecting means 32 whether or not the accelerator pedal 31 is OFF (Step S301). If the accelerator pedal 31 is OFF, the rotational speed of the compressor 14 is reduced to depressurize air by the pressure control means 35. Thereby, the quantity of air supplied to the fuel cell 12 is decreased, and thereby the quantity of power generation of the fuel cell 12 can be decreased (Step S302). On the other hand, if the accelerator pedal 31 is ON, the control returns to the processing in Step S301.

Next, it is judged by the brake operation detecting means 34 whether or not brake operation is ON (Step S303). In Step S303, it may be judged whether or not a fixed period of time has elapsed from when the accelerator pedal 31 is turned off. In this case, the brake operation detecting means 34 can be made unnecessary.

If the brake operation is OFF or the fixed period of time has not elapsed in Step S303, it is judged whether or not the accelerator pedal 31 is ON (Step S304). If the accelerator pedal 31 is not ON, the control returns to Step S303. Then, in Step S304, the operation for judging whether or not the accelerator pedal 31 is ON is repeated.

If the accelerator pedal 31 is ON in Step S304, the rotational speed of the compressor 14 is increased to pressurize air by the pressure control means 35. Thereby, the quantity of air supplied to the fuel cell 12 is increased, and thereby the quantity of power generation of the fuel cell 12 can be increased (Step S305). Thereafter, the control returns to Step S301, and the above-described operation is repeated.

On the other hand, if the brake is ON or the fixed period of time has elapsed in Step S303, it is judged that the vehicle is going to stop or is decelerating, and the operation of the compressor 14 is stopped (Step S306).

In Step S306, the operation of the compressor 14 (4) can be stopped by the control unit 17 (7) described in the first or second embodiment. Specifically, the rotational speed of compressor is reduced in accordance with the control method described with reference to FIG. 2, and the operation of the compressor 14 is stopped when the pressure difference $\Delta P$ between the upstream side and the downstream side of the compressor 14 becomes equal to or smaller than $\Delta P0$. Alternatively, the operation thereof may be stopped when predetermined time has elapsed after the rotational speed of the compressor 14 was reduced. In both the cases, when the pressure regulating valve 18 (or the throttle valve) for regulating the pressure of air supplied from the compressor 14 to the fuel cell 12 is provided in the fuel cell system 11, the pressure regulating valve 18 (or the throttle valve) can be fully opened after the rotational speed of the compressor 14 has been reduced in accordance with the control method described with reference to FIG. 5. Also, in the case that the discharge valve 19 for discharging air on the downstream side of the compressor 14 is provided in the fuel cell system 11, the discharge valve 19 may be fully opened after the rotational speed of the compressor 14 has been reduced. Further, in the case that both of the pressure regulating valve 18 (or the throttle valve) and the discharge valve 19 are provided, both of these valves can be fully opened after the rotational speed of the compressor 14 has been reduced.

After the compressor 14 has been stopped in Step S306, it is judged whether or not a system stop switch is ON (Step S307). If the system stop switch is ON, it is judged that the vehicle stops completely, and the control for the compressor 14 is finished.

On the other hand, if the system stop switch is OFF, it is judged that the vehicle stops temporarily only, and then it is judged whether or not the accelerator pedal 31 is ON (Step S308). If the accelerator pedal 31 is not ON, the control returns to Step S307.

If the accelerator pedal 31 is ON in Step S308, the compressor 14 is started again (Step S309). Then, the control proceeds to Step S305, where the quantity of air supplied to the fuel cell 12 is increased to increase the quantity of power generation in the fuel cell 12. Thereafter, the control returns to Step S301, and the above-described operation is repeated.

According to this embodiment, the pressure of air supplied to the fuel cell 12 is controlled by the accelerator operation detecting means 32 and the pressure control means 35. Further, the deceleration or stopping of vehicle is sensed by the accelerator operation detecting means 32 and the brake operation detecting means 34 to stop the compressor 14. Therefore, the waste of air supplied to the fuel cell 12 is eliminated, by which the fuel consumption can be improved. Also, since the operation of the compressor 14 is stopped after the pressure difference ΔP between the upstream side and the downstream side of the compressor 14 has been made small, the noise caused by the backflow of air can be suppressed.

The present invention is not limited to the above-described embodiments, and various changes and modifications can be made without departing from the spirit and scope of the present invention.

The invention claimed is:

1. A fuel cell system comprising:
a fuel cell;
a compressor which compresses air taken in from an outside and supplies compressed air to the fuel cell via a gas supply path;
means for suppressing noise generated by the backflow of air into the compressor comprising:
means for measuring a pressure difference between an upstream side and a downstream side of the compressor;
means for controlling the pressure difference so as to become equal to or smaller than a predetermined value when supply of air to the fuel cell is stopped; and
means for stopping operation of the compressor after said measured pressure difference has become equal to or smaller than the predetermined value.

2. The fuel cell system according to claim 1, further comprising a pressure regulating valve for regulating a pressure of the air supplied from the compressor to the fuel cell, wherein the pressure regulating valve is arranged in at least one of the gas supply path and a gas discharge path, which is a flow path of gas discharged from the fuel cell, and
the operation of the compressor is stopped after the pressure regulating valve has been opened and the pressure difference has become equal to or smaller than the predetermined value.

3. The fuel cell system according to claim 1, further comprising a discharge valve for discharging air on the downstream side of the compressor into atmosphere without causing the air to pass through the fuel cell,
wherein the operation of the compressor is stopped after the discharge valve has been opened and the pressure difference has become equal to or smaller than the predetermined value.

4. A fuel cell vehicle mounted with the fuel cell system according to claim 1, comprising:
accelerating operation detecting means for detecting operation of an accelerating operation member;
decelerating operation detecting means for detecting operation of a decelerating operation member; and
pressure control means which decrease a pressure of air supplied to the fuel cell when the accelerating operation member is not operated, and increase the pressure of the air supplied to the fuel cell when the accelerating operation member is operated,
wherein, when the pressure of the air is decreased by the pressure control means and the decelerating operation member is operated, operation of the compressor is stopped.

5. A fuel cell vehicle mounted with the fuel cell system according to claim 1, comprising:
accelerating operation detecting means for detecting operation of an accelerating operation member; and
pressure control means which decrease a pressure of air supplied to the fuel cell when the accelerating operation member is not operated, and increase the pressure of air supplied to the fuel cell when the accelerating operation member is operated,
wherein, when the pressure of air is decreased by the pressure control means and a fixed period of time has elapsed from when the accelerating operation member is not operated, operation of the compressor is stopped.

6. A fuel cell system comprising:
a fuel cell;
a compressor which compresses air taken in from an outside and supplies compressed air to the fuel cell via a gas supply path;
means for suppressing noise generated by the backflow of air into the compressor comprising:
means for setting the rotational speed of the compressor at a value which is smaller than the rotational speed of the compressor during ordinary power generation of the fuel cell but is greater than zero, when supply of air to the fuel cell is stopped;
means for measuring the time that has elapsed from when rotational speed of the compressor was set at the smaller value; and
means for stopping the operation of the compressor when the measured time reaches a predetermined time.

7. The fuel cell system according to claim 6, further comprising a pressure regulating valve for regulating a pressure of the air supplied from the compressor to the fuel cell, wherein the pressure regulating valve is arranged in at least one of the gas supply path and a gas discharge path, which is a flow path of gas discharged from the fuel cell, and the operation of the compressor is stopped after the pressure regulating valve has been opened and a pressure difference has become equal to or smaller than a predetermined value.

8. The fuel cell system according to claim 6, further comprising a discharge valve for discharging the air on the downstream side of the compressor into the atmosphere without causing the air to pass through the fuel cell, and wherein the operation of the compressor is stopped after the discharge valve has been opened and the pressure difference has become equal to or smaller than the predetermined value.

9. A fuel cell vehicle mounted with the fuel cell system according to claim 6, comprising:

accelerating operation detecting means for detecting operation of an accelerating operation member;

decelerating operation detecting means for detecting operation of a decelerating operation member; and pressure control means which decrease a pressure of air supplied to the fuel cell when the accelerating operation member is not operated, and increase the pressure of the air supplied to the fuel cell when the accelerating operation member is operated, wherein, when the pressure of the air is decreased by the pressure control means and the decelerating operation member is operated, operation of the compressor is stopped.

10. A fuel cell vehicle mounted with the fuel cell system according to claim 6, comprising:

accelerating operation detecting means for detecting operation of an accelerating operation member; and pressure control means which decrease a pressure of air supplied to the fuel cell when the accelerating operation member is not operated, and increase the pressure of air supplied to the fuel cell when the accelerating operation member is operated, wherein, when the pressure of air is decreased by the pressure control means and a fixed period of time has elapsed from when the accelerating operation member is not operated, operation of the compressor is stopped.

11. A fuel cell system comprising:

a fuel cell;

a compressor which compresses air taken in from an outside and supplies compressed air to the fuel cell via a gas supply path;

a throttle valve which is arranged in a gas discharge path, which is a flow path of gas discharged from the fuel cell; and means for suppressing noise generated by the backflow of air into the compressor comprising:

means for stopping operation of the compressor after a degree of opening of the throttle valve when supply of air to the fuel cell is stopped has been made large as compared with a case where the supply of air is not stopped.

12. A fuel cell vehicle mounted with the fuel cell system according to claim 11, comprising:

accelerating operation detecting means for detecting operation of an accelerating operation member;

decelerating operation detecting means for detecting operation of a decelerating operation member; and pressure control means which decrease a pressure of air supplied to the fuel cell when the accelerating operation member is not operated, and increase the pressure of the air supplied to the fuel cell when the accelerating operation member is operated, wherein, when the pressure of the air is decreased by the pressure control means and the decelerating operation member is operated, operation of the compressor is stopped.

13. A fuel cell vehicle mounted with the fuel cell system according to claim 11, comprising:

accelerating operation detecting means for detecting operation of an accelerating operation member; and pressure control means which decrease a pressure of air supplied to the fuel cell when the accelerating operation member is not operated, and increase the pressure of air supplied to the fuel cell when the accelerating operation member is operated, wherein, when the pressure of air is decreased by the pressure control means and a fixed period of time has elapsed from when the accelerating operation member is not operated, operation of the compressor is stopped.

14. A method for suppressing noise caused by backflow of air in a compressor in a fuel cell system, the method comprising:

measuring a pressure difference between an upstream side and a downstream side of the compressor;

controlling the pressure difference so as to become equal to or smaller than a predetermined value when supply of air to the fuel cell is stopped; and stopping the operation of the compressor when the pressure difference is less than a predetermined value corresponding to an allowable level of noise generated by the backflow of air into the compressor.

15. A method for suppressing noise caused by backflow of air in a compressor in a fuel cell system, the method comprising:

setting the rotational speed of the compressor at a value which is smaller than the rotational speed of the compressor during ordinary power generation of the fuel cell but is greater than zero, when the supply of air to the fuel cell is stopped;

measuring the time that has elapsed from when rotational speed of the compressor was set at a value which is smaller than that at a time of ordinary power generation of the fuel cell but is not zero; and stopping the operation of the compressor when the measured time reaches a predetermined time corresponding to a time at which an allowable level of noise is generated by the backflow of air into the compressor.

16. A method for suppressing noise caused by backflow of air in a compressor, the method comprising:

measuring the degree of opening of a throttle valve arranged in a gas discharge path;

increasing the degree of opening of the throttle valve when supply of air to the fuel cell is stopped; and stopping operation of the compressor after a degree of opening of the throttle valve has been made large as compared with a case where the supply of air is not stopped, wherein said large degree of opening corresponds to an allowable level of noise generated by the backflow of air into the compressor.

* * * * *